June 21, 1966 L. A. VAUGHN ETAL 3,257,030
VISUAL SOAP METER AND CLEANING SYSTEM UTILIZING SAME
Filed July 17, 1963 4 Sheets-Sheet 1

INVENTORS
Lawrence A. Vaughn
George W. Mattox
BY Bacon & Thomas
ATTORNEYS

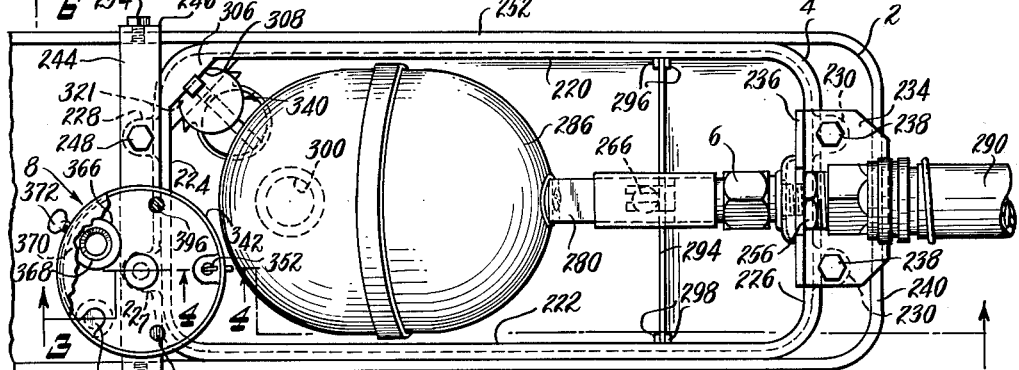
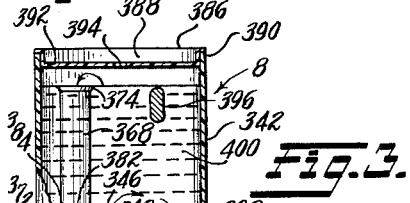
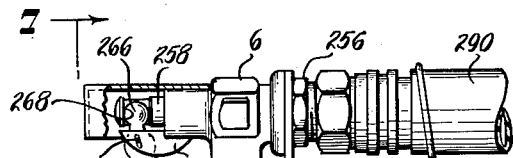
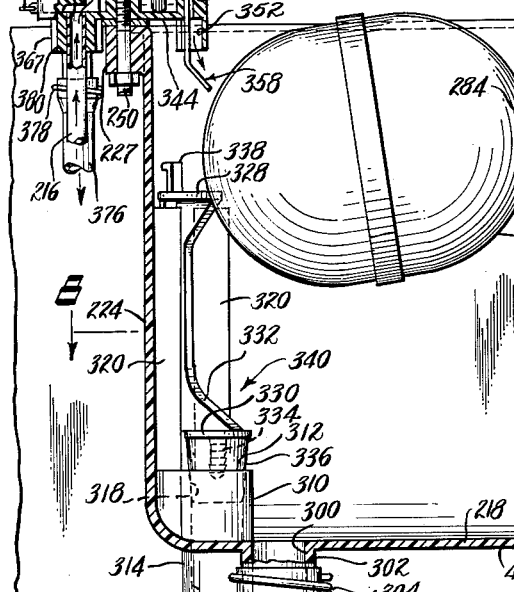
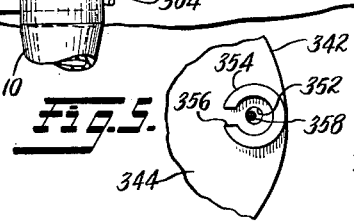
INVENTORS
Lawrence A. Vaughn
George W. Mattox
BY Bacon & Thomas
ATTORNEYS

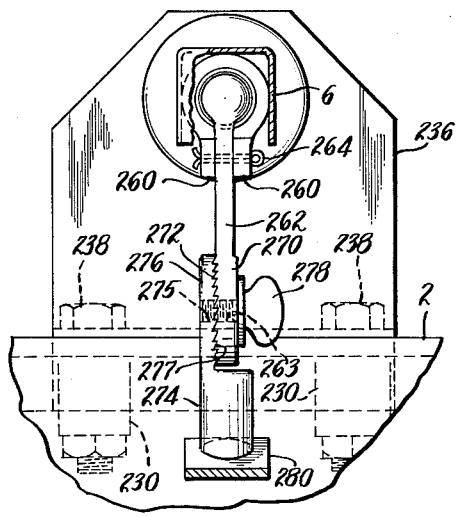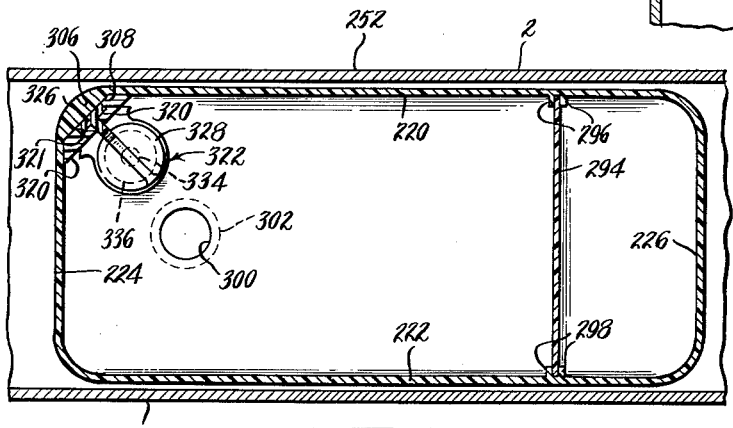

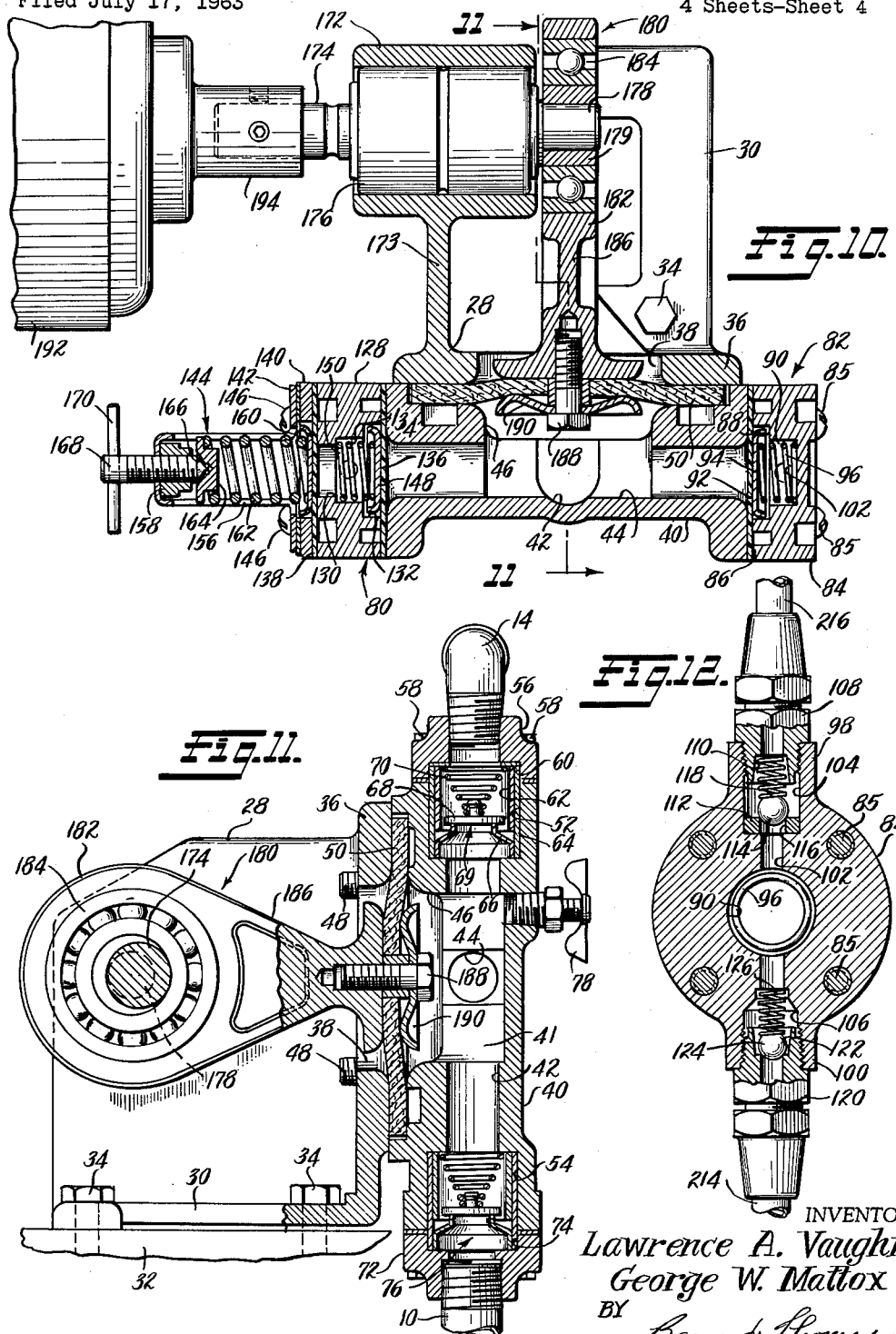

United States Patent Office 3,257,030
Patented June 21, 1966

3,257,030
VISUAL SOAP METER AND CLEANING SYSTEM UTILIZING SAME
Lawrence A. Vaughn, Covina, and George W. Mattox, El Monte, Calif., assignors to Clayton Manufacturing Company, El Monte, Calif., a corporation of California
Filed July 17, 1963, Ser. No. 295,761
20 Claims. (Cl. 222—23)

This invention relates generally to apparatus for mixing two liquids according to a preselected proportional ratio, and more particularly to an improved, adjustable liquid dispensing meter constructed to dispense liquid at a preselected, constant rate and to visually indicate whether the liquid being dispensed has the desired concentration.

There are many types of apparatus wherein it is necessary to mix one liquid with another liquid, according to a desired proportional ratio. For example, in steam cleaner systems it is common to mix a liquid soap solution with raw water, whereby to obtain a cleaning solution which is then at least partially converted into steam for use in cleaning automotive parts, engines, aircraft, floor and wall surfaces and the like.

In steam cleaning systems and other like apparatus, it is desirable that the proportionate relationship of the cleaning solution be maintained constant, whereby to obtain the maximum cleaning power from the resultant nozzle stream.

The cleaning system of the present invention includes a float tank, to which both raw water and a liquid soap solution are simultaneously supplied. The liquid soap solution is dispensed at a preselected rate of flow into the float tank by a novel liquid dispensing meter, which meter incorporates a container having a fixed orifice in the bottom thereof positioned to empty into the float tank. The container is also fitted with an adjustable, vertically disposed spill tube, which functions to provide an adjustable working liquid head above the fixed orifice to change the rate of supply of soap solution, if necessary. The supply of water is automatically controlled by a float-operated valve.

The soap solution is pumped into the container from a solution tank at a rate of flow greater than liquid can flow out of said container through the fixed orifice. The excess liquid within the container rises therein to the level of the upper end of the spill tube, and overflows through the spill tube back into the solution tank, thus maintaining a constant head.

As is well known, the rate of flow through a fixed orifice in a gravity flow device is dependent upon the height of the working liquid head; thus, the rate of flow can be readily altered by changing the height of the working head. The spill tube of the invention, as has been mentioned, is vertically adjustable, and thus the height of the working liquid head can be readily varied to obtain a desired rate of flow through the fixed orifice by altering the distance that the top of the spill tube projects above said orifice.

Once the spill tube has been fixed in position, and after the liquid soap solution being pumped into the container has reached the upper open end of said spill tube, a constant head will be maintained above the orifice. Because of this constant head, the rate of flow through the orifice will also be constant. Thus, it is possible with the liquid dispensing meter of the invention to select a prescribed rate of flow through the fixed orifice, and to maintain that rate of flow at a constant value.

The orifice on the dispensing meter is fitted with an elongated cleaning element, in the form of a bent wire, to prevent clogging thereof. The wire is agitated by the flow of liquid through the orifice, and is thus caused to move about sufficiently to provide a self-cleaning action and prevent the orifice from becoming clogged because of an accumulation of material therein.

The detergent or soap for use in a steam cleaning system is usually obtained in dry bulk, and must be fixed in proper proportion with raw water to provide the concentrated liquid soap solution, which is later mixed with water to provide the steam cleaning solution. Steam cleaning apparatus of the type to which this invention relates is commonly utilized in industrial establishments, garages and gasoline filling stations, and is often attended by unskilled labor, with the result that consistently good cleaning results are not always obtained. A means is therefore provided for visually indicating whether or not the soap solution has been properly mixed to the desired concentration to assure consistently effective cleaning, even with unskilled labor.

The container of the liquid dispensing meter has a pair of floats therein, said floats have different masses or buoyant properties. One of the floats is designed to remain adjacent the surface of the soap solution within the container when said solution has a specific gravity corresponding to that of a properly mixed solution. The other float, which preferably is of a different color than the first float, has a mass such that it will normally remain near the bottom of the container, but will float at the surface of the liquid if said liquid has a specific gravity greater than that which will maintain the first float near the surface; this condition will occur if the soap solution within the tank is improperly mixed and is too strong, and thus flotation of the second float will indicate such a state. To facilitate observation of the floats, the container of the liquid dispensing meter is constructed of a suitable transparent material.

The cleaning system of the invention further includes a pump incorporating three separate, but simultaneous operating positive displacement pumping units. One of the pumping units is connected to pump cleaning solution from the float tank to the inlet of a boiler or heating coil assembly. A second one of the pumping units is connected to pump soap solution from the solution tank into the container of the liquid dispensing meter, and the third pumping unit is utilized to pump fuel to a burner for heating the coil. The pump is constructed in a unique manner, in that the impulse provided by the first pump is utilized to drive the other two pumping units. Hence, if cleaning solution is not available, no fuel or soap solution will be pumped.

It is an object of this invention to provide an adjustable liquid mixing apparatus, constructed to mix two liquids according to a preselected, constant ratio.

Another object is to provide an adjustable liquid dispensing meter that will dispense liquid at a constant, preselected rate of flow.

A further object is to provide a liquid dispensing meter incorporating means to visually indicate the concentration strength of the liquid solution being metered.

It is also an object to provide a gravity operated liquid dispensing meter, provided with means to adjust the operating liquid head.

A further object is to provide a hydro-steam cleaning system constructed to supply a heated stream of fluid having a preselected, constant percentage of liquid cleaning agent therein.

A still further object is to provide a multiple unit pump wherein pulsations imparted to a liquid being pumped is utilized to actuate other pumping units.

Other objects, and many of the attendant advantages, of the present invention will become apparent from the following detailed description, when considered in connection with the accompanying drawings, wherein:

FIG. 2 is an enlarged, fragmentary plan view of the float tank and the liquid dispensing meter as viewed along the line 2—2 of FIG. 1;

FIG. 3 is a fragmentary, vertical sectional view, taken along the line 3—3 of FIG. 2, showing in detail the construction of the float tank and the liquid dispensing meter;

FIG. 4 is a further enlarged, fragmentary, vertical sectional view, taken along the line 4—4 of FIG. 2, showing the construction of the metering orifice and the elongated cleaning element received therein;

FIG. 5 is a fragmentary, bottom view of the metering orifice with a cross-section through the orifice wire, taken along the line 5—5 of FIG. 4;

FIG. 6 is a vertical, fragmentary, sectional view, taken along the line 6—6 of FIG. 2, showing in particular the construction of, and the mounting means for, the spill tube of the liquid dispensing meter;

FIG. 7 is an enlarged, fragmentary view with portions broken away showing the adjustable float support as viewed along the line 7—7 of FIG. 3;

FIG. 8 is a horizontal, fragmentary, sectional view, taken along the line 8—8 of FIG. 3, showing the construction of the drain plug assembly, which is mounted in the float tank;

FIG. 9 is a perspective view of the drain plug assembly per se;

FIG. 10 is an enlarged, fragmentary, horizontal sectional view, taken along the line 10—10 of FIG. 1, showing the construction of the multiple pump utilized with the invention;

Figure 1:
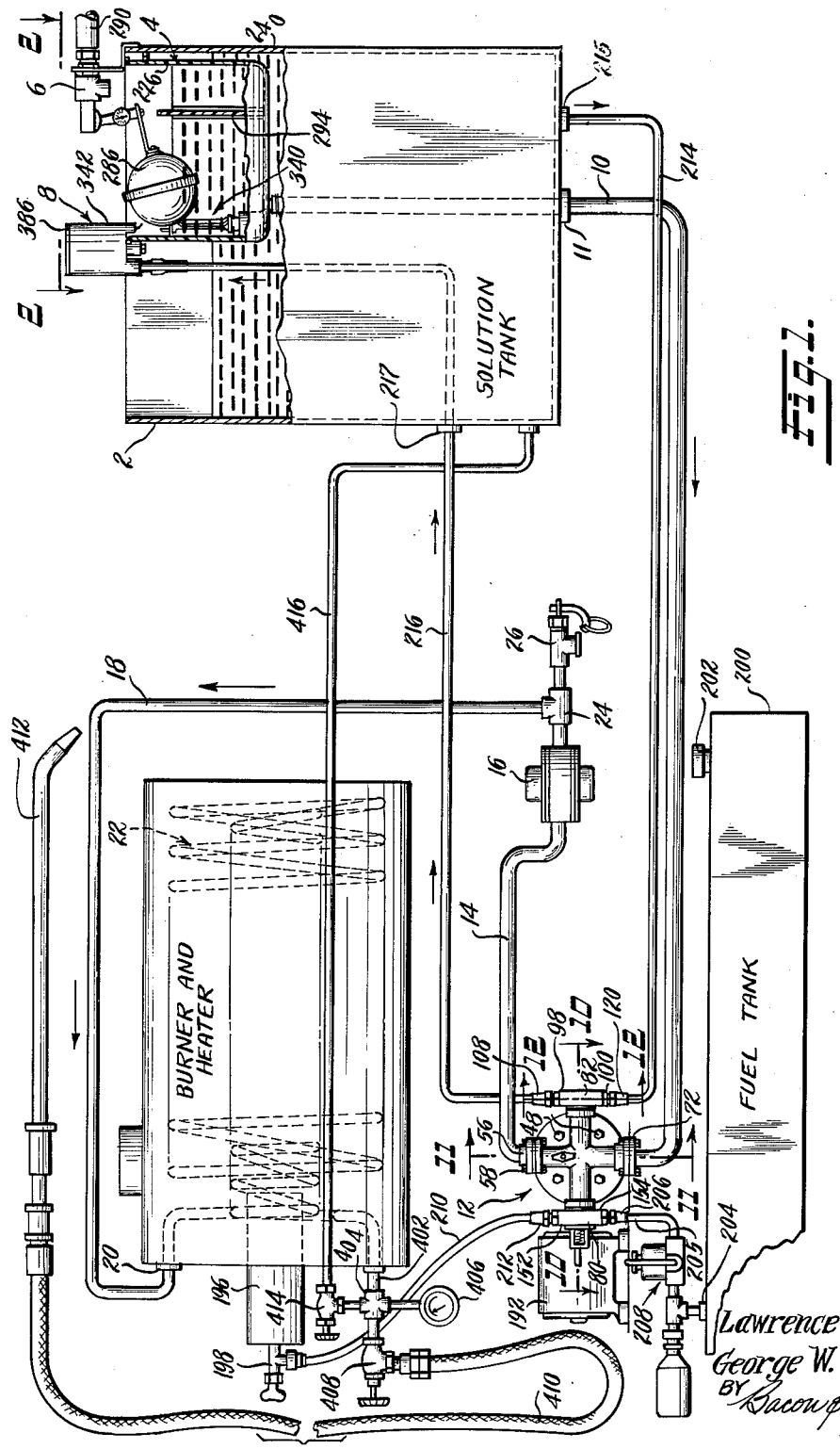
FIG. 1 is a fragmentary, diagrammatic view of a steam cleaning system incorporating the soap solution dispensing and mixing apparatus of the present invention.

FIG. 11 is a vertical, sectional view, taken along the line 11—11 of FIGS. 1 and 10, showing the valve assembly of the main pump chamber; and FIG. 12 is an enlarged, vertical sectional view taken along the line 12—12 of FIG. 1, showing the inlet and outlet check valves of one of the auxiliary pumps.

Referring now to the drawings, a steam cleaning apparatus is diagrammatically shown in FIG. 1, and includes a solution tank 2 having a separate float tank 4 mounted within the upper end thereof. Raw water is supplied to the float tank 4 through a float-operated inlet valve 6.

The tank 2 contains a concentrated liquid soap solution consisting of water and a suitable cleaning agent. This solution is mixed with raw water in the float tank to produce a cleaning solution for use in the cleaner system. A meter 8 for dispensing the soap solution is mounted on the float tank 4, and is arranged to dispense concentrated soap solution into the float tank 4, in a manner to be described hereinafter.

A withdrawal conduit 10 is connected to the bottom of the float tank 4, and extends downwardly through the solution tank 2. The conduit 10 passes through a suitable fitting 11 in the bottom of the solution tank 2, and extends to the inlet side of the main pumping chamber of a pump 12. A conduit 14 is connected at one end thereof to the outlet side of the main pumping chamber of the pump 12, and is connected at its other end to a backflow pressure regulator 16. A conduit 18 connects the pressure regulator 16 with the inlet 20 of a heating coil assembly 22, the conduit 18 extending from a T-fitting 24, one leg of which is connected to a drain valve 26.

The pump 12 is of the positive displacement type, and incorporates a main and two auxiliary pumping units, which are arranged to operate simultaneously. The construction of the pump 12 is shown in detail in FIGS. 10 through 12.

Referring to FIGS. 10 and 11, the pump 12 includes a frame 28 having a horizontally disposed flange 30 on the lower end thereof. The flange 30 rests upon a suitable base 32, to which it is secured by bolts 34. The frame 28 includes a vertical flange 36 on the front face thereof, said flange having a central opening 38 therein.

A manifold housing 40 includes a pumping chamber 41 intersected by a vertical passage 42 and a horizontal passage 44; the passages 42 and 44 are arranged in a cruciform fashion. The housing 40 has a central opening 46 therein at the juncture of the passages 42 and 44, said opening confronting the opening 38 in the vertical flange 36. The manifold housing 40 is secured to the flange 36 by bolts 48 (FIGS. 1 and 11), and a flexible diaphragm 50 is clamped therebetween in position to extend across the confronting openings 38 and 46.

The vertical passageway 42 communicates with the main pump chamber 41, and terminates at its upper and lower ends in counterbores 52 and 54, respectively. An upper flange 56 is secured to the upper end of the housing 40 about the counterbore 52 by bolts 58, and one end of the conduit 14 is threadably connected thereto. The face of the flange 56 which confronts the counterbore 52 has a counterbore 60 therein.

Fitted within the confronting counterbore 52 and 60 is a pair of telescoped, inner and outer sleeves 62 and 64, respectively; the inner sleeve 62 is shorter than the outer sleeve 64, and the upper ends of the two sleeves are flush. A reducing collar 66 is received within the lower end of the outer sleeve 64 with its smaller end directed upwardly, and a valve disk 68 is disposed to rest upon the upper end of said reducing collar. A frusto-conical compression spring 70 extends between the flange 56 and the top surface of the disk 68, and tends to retain the disk 68 in sealing engagement with the upper end of the reducing collar 66. Thus, the disk 68 and the reducing collar 66 together defines a one-way flow or outlet check valve 69.

A lower flange 72 is similarly secured to the lower end of the manifold housing 40, and contains a counterbore 74 therein positioned to confront the counterbore 54. A one-way flow, or inlet check valve 76, which is identical in construction to the valve 69, is contained within the confronting counterbores 54 and 74. The main pump chamber 41 is provided with a conventional vent and/or drain cock assembly 78.

The pump 12 further includes an adjustable fuel pumping unit 80, FIG. 10, and a nonadjustable soap solution pumping unit 82, said pumping units 80 and 82 being positioned at opposite ends of the horizontal passage 44. The soap solution pumping unit 82 includes a body 84 secured by screws 85 to the end face 86 of the housing 40 in axial alignment with the right-hand end of the horizontal passage 44, and contains first and second counterbores 88 and 90, bore 90 serves as a pump chamber for the soap pump 82. A flexible diaphragm 92 is secured between the body 84 and the manifold housing 40, and extends across the horizontal passage 44 and the first counterbore 88. A spring cover 94 is disposed within the counterbore 88 in engagement with the diaphragm 92, and a spring 96 is compressed between said spring cover 94 and the bottom wall of the chamber 90. Thus, the spring 96 functions to urge the diaphragm 92 toward the horizontal passageway 44.

The body 84, as is best shown in FIG. 12, has a pair of diametrically opposed bosses, namely, an outlet boss 98 and an inlet boss 100 on the upper and lower sides thereof, respectively. A bore 102 passes vertically through the center of the body 84, and intersects the pump chamber 90. The bore 102 terminates at its upper and lower ends in threaded counterbores 104 and 106, respectively, which extend into the bosses 98 and 100.

A threaded fitting 108 is mounted in the upper counterbore 104, and has a frusto-conical recess 110 in the bottom thereof. A washer 112 is received within the counterbore 104, and a ball 114 rests within an opening 116 in said washer. A compression spring 118 is seated within the recess 110, and engages the ball 114 to urge it into engagement with the washer 112. Thus, the ball 114 and the spring 118 define an outlet check valve, constructed to permit flow from the chamber 90 in an upward direction, as viewed in FIGS. 1 and 12.

The lower counterbore 106 has a fitting 120 threaded therein, said fitting having a frusto-conical recess 122 in the top face thereof, within which is received a ball 124 and the end wall of the counterbore 106, and functions to urge the ball 124 downwardly into engagement with the fitting 120. Thus, the ball 124 and spring 126 define an inlet check valve communicating with the pump chamber 90.

The adjustable fuel pumping unit 80, FIG. 10, includes a body 128 having a bore 130 extending therethrough including a first and a second counterbore 132 and 134, respectively, positioned to confront the left-hand end of the horizontal passage 44. The bore 130 serves as a pumping chamber for the pump unit 80. A diaphragm 136 is disposed between the body 128 and the manifold housing 40, and a second diaphragm 138 is disposed between the other end of the body 128 and an annular ring 140. A radial flange 142 of a spring housing 144 is positioned over the annular ring 140, and a plurality of screws 146 pass through the radial flange 142, the annular ring 140, the diaphragm 138, the body 128, and the diaphragm 136, and are received within threaded bores in the manifold housing 40.

A spring cover 148 is disposed within the first counterbore 132, and a compression spring 150 is seated within the second counterbore 134 and engages the spring cover 148. The spring 150 functions to urge the diaphragm 136 toward the horizontal passageway 44. The upper and lower sides of the body 128 are provided with bosses 152 and 154, respectively (FIG. 1), within which are disposed a bore, a counterbore, and outlet and inlet check valves, communicating with the pump chamber 130, which are identical to the bore 102, counterbores 104 and 106, and check valves 114–118, and 124–126 illustrated in FIG. 12.

The spring housing 144 includes a slotted cylindrical body 156 having a nut 158 welded therein near the outer end thereof. A spring cover plate 160 is disposed in contact with the outer side of the diaphragm 138, and a spring 162 is positioned within the cylindrical body 156, and is in contact at one end with the cover plate 160. The other end of the spring 162 has a flanged disk 164 received therein, said disk being positioned to confront the nut 158 and having a conical recess 166 therein. An adjusting screw 168 is threaded through the nut 158, and has a conical tip thereon which is received within the conical recess 166. The outer end of the screw 168 is provided with a handle 170 to facilitate manipulation thereof. It is apparent that by manipulating the adjusting screw 168, the amount of pressure exerted on the diaphragm 138 by the spring 162, and consequently the volume of fuel pumped by the unit 80 may be readily varied.

The frame 28, FIGS. 10 and 11, has a cylindrical collar 172 supported by a vertical web 173 formed integral with the base 32 and the flange 36, and extending generally parallel to the horizontal passage 44. A shaft 174 is rotatable in ball bearings 176 mounted in the collar 172, and has an eccentric stub end 178 disposed to lie directly in line with the center of the diaphragm 50.

A crankarm 180 includes an annular boss 182 having a ball bearing 184 received therein. The stub shaft 178 carries a bushing 179 mounted within the inner race of the ball bearing 184. An arm 186 extends forwardly from the boss 182 toward the diaphragm 50 and has a circular pad which is secured to said diaphragm by a bolt 188 and a disk 190. A motor 192 has an output shaft 194 connected to the shaft 174 in a conventional manner. Thus, as the shaft 174 is revolved by the motor 192, the eccentric action of the stub shaft end 178 will cause the central portion of the diaphragm 50 to move back and forth to pump liquid from the central chamber 41 and to impart pulsations to the diaphragms 92 and 136 of the fuel and soap pump units 80 and 82, respectively.

Referring to FIG. 1, the boiler assembly 22 includes a fuel atomizing type burner 196, which is fitted at its inlet end with a control valve 198. A fuel tank 200 has a filling inlet 202, and an outlet 204 which is connected to the inlet boss 154 of the adjustable fuel pump 80 through a conduit 205 and a fitting 206. A conventional settling bulb and filter apparatus 208 is connected in the conduit 205. A conduit 210 is connected at one end to the outlet boss 152 of the adjustable pumping unit 80 by a fitting 212, and its other end extends to, and is connected with the burner control valve 198. Thus, the fuel pumping unit 80 functions to pump fuel from the fuel tank 200 to the burner 196 at a predetermined rate.

The solution tank has one end of a withdrawal conduit 214 connected to the bottom thereof by a fitting 215 and the other end of said conduit is connected to the fitting 120 mounted in the inlet boss 100 of the soap pump 82. A conduit 216 is connected at one end to the fitting 108 mounted in the outlet boss of the soap pump 82, and extends through a suitable fitting 217 mounted in the side wall of the solution tank 2, and upwardly to the dispensing meter 8. Thus, the pumping unit 82 functions to pump liquid soap solution from the solution tank 2 into the dispensing meter 8.

The operation of the motor driven pump 12 is as follows: The crank arm 180 will cause the diaphragm 50 to be flexed back and forth. This motion will draw liquid, consisting in this instance of a mixture of soap solution and raw water, from the float tank 4 into the main pumping chamber 41 through the inlet check valve 76 on the outward stroke of the diaphragm 50, and will discharge such liquid through the outlet check valve 69 upon the inward stroke of said diaphragm. Each complete cycle of the diaphragm will generate an impulse in the liquid within the main pumping chamber 41, which will be transmitted to the soap solution pump diaphragm 92 and the fuel pump diaphragm 136 through the horizontal passage 44.

Each impulse generated by the main diaphragm 50 will cause the central portion of the diaphragms 92 and 136 to reciprocate against the force of their associated return springs 96 and 150, respectively. This reciprocating action will cause soap solution and fuel to be alternately drawn into the bodies 84 and 128, respectively, through the inlet check valves contained in the inlet bosses 100 and 154, respectively, and to be expelled from said bodies through the outlet check valves contained in the outlet bosses 98 and 152, respectively. Thus, the auxiliary soap solution and fuel pumps 80 and 82, respectively, are simultaneously operated in response to actuation of the water liquid pump diaphragm 50. Hence, in the absence of liquid from tank 4 to be supplied to the heating coil 22, no fuel will be supplied to the burner 196, and no soap solution will be pumped to the dispensing meter 8.

The float tank 4, FIGS. 2, 3, 6 and 8, is preferably molded from plastic material and includes a bottom wall 218, a pair of vertical side walls 220 and 222, and a pair of end walls 224 and 226. The external, upper end of the end wall 224 has spaced, integrally formed hollow bosses 227 and 228 thereon, and the end wall 226 has a similar pair of bosses 230 along its top edge. A bracket 232 includes a horizontal base portion 234, and a vertically extending valve-supporting wall 236. The horizontal base 234 has a pair of spaced openings therethrough, positioned in alignment with the hollow bosses 230, and bolts 238 are passed through said base and said bosses to secure the bracket 232 to the float tank 4. The base 234 extends over the edge of an end wall 240 of the solution tank 2, and has a downturned lip 242 thereon which engages the outside of said end wall, as is best shown in FIG. 3.

The float tank 4, see FIG. 1, has a length equal to about one-half the length of the solution tank 2, a width slightly less than that of said solution tank, and a height equal to about one-third the height of said solution tank. Thus, the float tank 4 is conveniently received within the tank 2. In order to further support the float tank 4 in the solution tank 2, a bracket 244 is secured to the bosses 227 and 228 on the end wall 224 of said float tank 4, and comprises an elongated bar having downturned tabs 246 at the opposite ends there (FIG. 6). The bracket 244 has a pair of spaced openings positioned in alignment with the hollow bosses 227 and 228, and a bolt 248 passes through the boss 228 and the bracket 244 to secure the latter in position. A bolt 250 passes through the boss 227 and the other of the spaced openings in the bracket 244, and is secured, in a manner hereinafter described, to the dispensing meter 8. The downwardly turned tabs 246 extend over the top edge of side walls 252 of the solution tank 2, and are secured to said side walls by bolts 254.

The upwardly extending wall 236 has an opening extending therethrough for the reception of the threaded inlet end of the float valve 6, said valve being secured in position by a jam nut 256. The valve 6 is of a commercially available type, and is operated by a plunger 258. When the plunger 258 is shifted to the left, as viewed in FIG. 3, the valve 6 will open to allow flow of water into the tank 4.

The valve 6 has a pair of spaced ears 260 thereon positioned below the plunger 258 between which is positioned an upper float arm section 262, which is pivoted on a pin 264 that passes through aligned openings in the ears 260. The upper end 266 of the float arm section 262 has a spherical configuration, and is received within a recess 268 in the plunger 258. The lower end of the float arm section 262 terminates in a disk 270 having radial serrations 272 on one face thereof, as is best shown in FIG. 7.

A lower float arm section 274 is provided at its upper end with a disk 276 having radial serrations 277 thereon that mesh with the serrations 272 on the lower end of the upper float arm section 262. The lower float arm section 274 has a threaded bore 275 therein, which is positioned to confront an unthreaded bore 263 in the lower end of the upper float arm section 262, and a thumbscrew 278 is received within said two aligned bores 263 and 275 for adjustably securing the two float arm sections 262 and 274 together.

The lower float arm section 274 has one end of a bracket 280 secured thereto by a screw 282, the opposite end 284 of said bracket 280 being bent downwardly at a 90 degree angle. A conventional float 286 is secured to the bracket end 284 by a screw 288, and is receivable within the float tank 4. When there is no liquid in the tank 4, or if the liquid level drops below a given level, the float 286 will be unsupported buoyantly and will assume a position in the tank, whereby the upper end 266 of the float arm section 262 will pivot about the pin 264 and will move the plunger 258 to the left to open the valve 6. When the tank 4 has filled sufficiently with water, the float 286 will be supported by said liquid and will rise vertically a distance sufficient to close the valve 6. The operation of such float-controlled valves is well understood and, hence, will not be further described. Water is supplied to the inlet end of the valve 6 through a conduit 290 connected thereto.

The outlet 292 of the valve 6 is directed downwardly toward the tank 4. In order to prevent undue turbulence within the tank 4 during filling thereof, said tank is provided with a baffle 294. The side walls 220 and 222 of the tank 4 have integrally formed, vertically extending pairs of ribs 296 and 298, respectively, thereon, which are positioned to receive the baffle 294 and to hold it in position. The baffle 294 extends vertically from the bottom wall 218 a distance equal to about three-fourths the height of the tank 4, and is spaced from the end wall 226 a distance equal to about one-fifth the length of the tank 4. The outlet 292 of the valve 6 is directed into the region between the baffle 294 and the end wall 226.

The bottom wall 218 of the float tank 4 has an outlet 300 positioned near the end wall 224, and remote from the baffle 294. The underside of the bottom wall 218 has a cylindrical boss 302 formed thereon aligned with the outlet port 300, and the upper end of the conduit 10, which may comprise a section of hose, is expanded over said boss 302 and is secured thereto by a spring clamp 304. Thus, the outlet port 300 is connected by the conduit 10 to the inlet of the main pumping chamber 42 of the pump 12.

The corner of the float tank 4 where the side wall 220 and the end wall 224 meet has a fillet 306 extending throughout the vertical height thereof, said fillet providing a land 308 which extends at a 45 degree angle to the side wall 220 and the end wall 224. The bottom wall 218 of the tank 4, adjacent the lower end of said land 308, has an upwardly extending boss 310 thereon, which terminates in a top horizontal face 312. As is best shown in FIGS. 3 and 6, a cylindrical extension 314 projects downwardly from the underside of the bottom wall 318 in alignment with the boss 310, and a passage 316 extends through both. The upper end 318 of the passage 316 is frusto-conically tapered, and opens into the interior of the tank 4. Thus, the passage 316 provides an outlet into the solution tank 2 from the float tank 4, the entrance to said passage 316 being positioned a distance above the bottom wall 218, whereby sediment or other matter which might settle to the bottom of said float tank 4 cannot drain through the passage 316.

The vertical land 308, as is best shown in FIG. 8, has a pair of confronting, generally L-shaped gibs 320 secured thereto which form a T-shaped slot 321. The outer edges of the gibs are shaped to conform to the adjacent side and end walls 220 and 224, respectively. While the gibs 320 are shown to be formed separately from the tank 4, it is to be understood that, alternatively, the T-shaped slot could be molded in a corner fillet of larger size than the fillet 306.

A drain plug assembly for the passage 316 includes a handle 322, as illustrated in FIGS. 2, 3, 8 and 9, and a vertical bar 324 having a projecting T-shaped rib 326 on its rear face extending throughout the vertical length thereof. The rib 326 is slidable in the T-shaped slot defined by the gibs 320.

The handle 322 has an integral flange 328 at its upper end and a disk 330 at its lower end; a vertical rib 332 extending between said flange and disk and being secured to the bar 324. The disk 330, as is best shown in FIG. 9, is offset outwardly from the bar 324, so as not to interfere with the reception of the T-shaped rib 326 within the slot 321. The disk 330 has a stepped stud 334 (FIG. 3) projecting downwardly therefrom, and a frusto-conical resilient plug 336 is mounted on said stud. The handle 322 and the disk 330 are proportioned so that the plug 336 will be positioned in alignment with the passage 316 in the boss 310. A finger hold 338 projects upwardly from the flange 328, and provides a convenient grip for lifting the float tank drain plug assembly.

The purpose of the drain plug assembly is to provide a means for readily filling the solution tank 2 by draining water from the float tank 4 so that a detergent can be added thereto when it is desired to form a soap solution in the tank 2. When it is desired to so fill the tank 2, the handle 322 is raised to lift the plug 336 from the passage 316, whereby water can readily flow from the tank 4 into the tank 2. It will be obvious that such flow will drain the tank 4 sufficiently so that the float 286 will move downwardly, whereby the valve 6 will be automatically opened to supply water to the tank 4. The float 286 will remain in its down position for so long as the plug 336 is raised, whereby a continuing flow of water from the valve 6 into the tank 4, and thence into the tank 2, will be obtained. When the tank 2 has been filled to the desired level, the handle 322 is moved downwardly to seat the plug 336 in the passage 316. The tank 4 will then fill and the float 286 will rise sufficiently to close the valve 6 in the normal manner.

The liquid dispensing meter 8 is constructed to dispense soap solution into the tank 4 at a preselected, constant rate of flow. The meter 8, FIGS. 2, 3 and 6, comprises a generally cylindrical, transparent container 342 having a bottom wall 344. The bottom wall 344 has a centrally positioned, cylindrical boss 346 thereon, and a threaded bore 348 extends upwardly into said boss through said bottom wall. The container 342 is secured in position over the edge of the tank 4 by the stud bolt 250, which extends through the boss 227 and the bracket 244, and is threaded in the bore 348.

Referring in particular to FIGS. 2, 3, 4 and 5, the container 342 has an upwardly extending cylindrical boss 350 on the bottom wall 344 near the outer portion thereof. The boss 350 has a cylindrical bore, or orifice, 352 extending therethrough, which defines a fixed size orifice for dispensing liquid soap solution from the container 342 into the float tank 4. As is best shown in FIG. 2, the container 342 is positioned with the orifice 352 disposed to open into the tank 4. The bottom wall 344 has a depending cylindrical extension 354 aligned with the orifice 352, the internal diameter of said extension 354 being about twice the diameter of the orifice 352. The extension 354 has a vertical slot 356 therein, the width of which is about equal to the diameter of the orifice 352, said slot 356 facing inwardly toward the center of the bottom wall 344.

As is best shown in FIG. 4, a cleaning element 358 is disposed within the orifice 352, and comprises a wire including a straight main portion 360, an upper retaining portion 362 bent at right angles to the main portion 360, and a lower angled portion 364 bent at about a 45 degree angle to the main portion 360. The portion 360 has a length greater than the distance measured from the top of the boss 350 to the lower end of the extension 354. When liquid flows through the orifice 352 it will strike the angled portion 364 of the wire cleaning element 358, and will thus cause said element to be agitated and moved about within the orifice 352. Such agitation of the element 360 will cause the orifice 352 to be cleaned, and will thus prevent clogging thereof from a build-up of material carried by the liquid being dispensed.

Referring to FIG. 2, a vertical boss 366 is disposed about 135 degrees counter-clockwise from the orifice 352. The boss 366 extends upwardly from the bottom wall 344 and inwardly from the side wall of the container 342. A cylindrical extension 367 depends from the bottom wall 344, as is best shown in FIGS. 3 and 6, and a bore extends through the boss 366 and extension 367 for the reception of a cylindrical spill tube 368. A threaded bore 370 passes through the side wall of the container 342 and the side wall of the portion of the boss 366, which projects above the bottom wall 344, and a thumbscrew 372 is received therein. The thumbscrew 372 is engaged with the spill tube 368, and functions to secure the spill tube 368 at any desired vertical position within the container 342.

The upper end 374 of the spill tube 368 is flared, and the lower end thereof has the upper end of hose section 376 secured thereto by a suitable spring clamp 378, the hose 376 extending downwardly into the solution tank 2.

The purpose of the spill tube 368 is to establish a constant working liquid head above the orifice 352 within the container 342. To this end, the container 342 is inscribed with graduations A and B, as will be explained more fully hereinafter. Liquid soap solution is pumped from the tank 2 to the container 342 by the pump unit 82 at a rate faster than it can be dispensed therefrom through the metering orifice 352. Thus, the liquid level within the container 342 will build up until it reaches the flared, upper end 374 of the spill tube 368. When the top of the spill tube 368 has been reached by the liquid, it will overflow into the spill tube and will drain into the solution tank 2 through the hose 376. It is thus seen that the height of the working head within the container 342 can be readily varied by merely adjusting the vertical height of the spill tube 368 above the entrance to the orifice 352. The spill tube 368 can drain excess liquid from the container 342 faster than it is supplied by the pump 82, so that there is no problem of the container 342 overflowing.

Disposed about 75 degrees counter-clockwise from the boss 366 is a cylindrical boss 380, which projects downwardly from the lower side of the bottom wall 344. The boss 380, as is best shown in FIG. 3, has a passage 382 therethrough, within which is received and cemented the upper end of the conduit 216. Projecting from the side wall of the container 342 a short distance above the passage 382 is a nearly circular, horizontal baffle 384, said baffle being spaced from the bottom wall 344 a distance equal to a little less than the radius of the passage 382. The arcuate periphery of the baffle 384 is of about the same diameter as the passage 382. As was described hereinabove, the pump 82 functions to pump liquid soap solution from the solution tank 2 through the conduit 216 and to the liquid dispensing meter 8. The baffle 384 in the container 242 functions to diffuse the stream of such liquid as it enters the container 342, and thus reduces turbulence within said container.

The container 342 is constructed of transparent material, such as plastic, whereby the position of the spill tube 368 may be readily observed, as may also the operation of the entire dispensing meter. The container 342 is fitted with a generally cup-shaped lid 386, said lid comprising a cylindrical side wall 388 having a peripheral flange 390 thereon which overlies the rim of said container. The bottom wall 392 of the lid 386 has a centrally positioned air vent opening 394 therein.

The liquid dispensing meter 8 is provided with means to facilitate accurate adjustment of the upper end of the spill tube 368 to provide the required head above the level of the orifice 352 to assure the desired rate of metering of soap solution to the tank 4. In this connection, the container 342 is inscribed with a graduation mark A to indicate the height of the upper end of the spill tube 368 for LIGHT DUTY cleaning. A graduation B, at a higher level on the container 342, indicates the level of the upper end of the spill tube 368 for HEAVY DUTY cleaning. The graduations A and B are located at appropriate liquid levels to produce the hydraulic heads required to provide 0.25% and 0.5%, respectively, soap content in the cleaning solution at the discharge nozzle 412.

The liquid dispensing meter 8 is also provided with means for indicating whether the soap solution 400 has the necessary concentration, preferably 10%, to provide the soap content desired in the cleaning solution at the discharge nozzle 412. Thus the container 342 is provided with a pair of elongated floats 396 and 398, which assume different positions in the liquid soap solution 400 in the container 342, depending upon the specific gravity of said soap solution. Visual indication of the condition of the soap solution 400 is facilitated by making the float 396 of green plastic and float 398 of red plastic, both floats being weighted by a metal insert (not shown) and designed so that they will either float to the surface of the soap solution, or remain totally submerged on the bottom 344 of the container 342, depending upon the specific gravity of the soap solution. The floats 396 and 398 are preferably weighted at one end so that they will remain vertical.

Instructions are given to the operator with respect to the quantity of dry soap to be mixed with a given amount of water in the solution tank 2. The strength of the solution can be checked with respect to proper concentration and mixing by determining its specific gravity. The floats 396 and 398 automatically perform this function.

Assuming that the spill tube 368 is adjusted to either the light duty or the heavy duty graduations A or B, respectively, the green float 396 is weighted to float at the surface of the liquid at the prescribed 10% strength. Under such condition, the green float 396 will float at the surface of the liquid, and the red float 398 will remain submerged on the bottom 344. If the soap solution is mixed stronger than, for example, 10½% strength, then the red plastic float will leave the bottom 344 of the container 342 and float to the top of the liquid. If the soap solution has a concentration substantially less than 10%, for example 9.5%, then both floats 396 and 398 will remain submerged on the bottom 344.

If a soap content falling between 0.25% and 0.5% at the discharge nozzle 412 is desired, then the spill tube can be adjusted to the desired height between the graduations A and B, but the function of the floats 396 and 398 to indicate proper or excessive concentration, as described above, will remain the same. FIGS. 3 and 6 of the drawings illustrate the floats 396 and 398 in the positions they assume with proper soap concentration to effect heavy duty cleaning.

It is contemplated that the liquid metering device 8 can be utilized to mix liquids other than water and liquid soap solution and to be associated with various different types of devices. However, for purposes of this invention, it has been described with reference to the steam cleaning system illustrated in FIG. 1.

The general operation of the invention is as follows:

Initially, the solution tank 2 will be empty. When it is desired to prepare the steam cleaning apparatus for use, a liquid soap solution must be first mixed in the solution tank 2. To accomplish this, the procedure is to place a specified, weighted quantity of dry bulk cleaning agent within the solution tank 2, and to then add raw water to obtain soap solution of the desired concentration. To this end, the handle 322 of the drain plug assembly 340 is raised, waterby water will flow from the float tank 4 into the solution tahk 2. Such flow is continued until the solution tank is nearly filled to the required level. The handle 322 is then pushed downwardly to seat the plug 336 in the passage 316. The tank 4 will continue to fill until the float 286 effects closing of the valve 6.

The apparatus of FIG. 1 includes means to facilitate mixing of the solution in the tank 2. The outlet 402 of the heating coil assembly 22 is connected with a fourway fitting 404, to one leg of which is attached a pressure gauge 406. A discharge control valve 408 is attached to another leg of the fitting 404, and has a hose 410 and a cleaning nozzle 412 attached thereto. The remaining leg of the fitting 404 is connected to a bypass valve 414 installed in a bypass conduit 416.

The bypass conduit 416 extends from the outlet 402 to the lower end of the solution tank 2. After a portion of the desired quantity of water has been admitted into the tank 2, the pump 12 is actuated to pump liquid from the tank 4 through the coil assembly 22. Since the pump 12 is a positive displacement pump, the outlet valve 408 is partially opened at this time, and the bypass valve 414 is fully opened. As a result, the heated water from the coil 22 will flow into the solution tank 2, through bypass conduit 416 where it will cause turbulence and help to dissolve and mix the cleaning agent with the water in said tank. Flow from the coil 22 is continued until the solution tank 2 has filled to the desired level, at which time the bypass valve 414 is closed.

After the soap solution has been prepared in the tank 2, the cleaning system is ready for operation. The pump 12 will continue to pump liquid from the float tank 4 through the conduit 10, and into the coil 22 through the conduit 18. Simultaneously, the auxiliary pump unit 82 will pump soap solution from the solution tank 2 to the dispensing meter 8 through the conduit 214, and into the inlet passage 382 of the container 342 through the conduit 216.

The spill tube 368 is adjusted vertically to provide a working liquid head within the container 342 of a height to insure that the rate of flow through the orifice 352 will have the value necessary to produce the selected proportional ratio of soap solution to raw water within the float tank 4. The soap pump 82 has a capacity sufficiently great so that the soap solution will enter the container 342 at a rate faster than it can flow out of the container through the orifice 352. All excess solution will flow out of the container 342 through the spill tube 368 and drain back into the solution tank 2.

As the pump 12 operates, the fuel pump 80 will also be actuated. The pump 80 functions to transfer fuel from the fuel tank 200 to the burner assembly 196 whereby the coil 22 is heated. The liquid in the heating coil 22 is under super atmospheric pressure and will pass through the outlet valve 408 and into the hose 410 and at least a portion thereof will flash into steam upon discharge from the nozzle 412 into the atmosphere. The nozzle 412 can then be directed wherever necessary to steam-clean the desired objects or surfaces.

It is again emphasized that the liquid dispensing meter 8 is constructed to dispense the liquid soap solution at a constant rate of flow into the tank 4. This constant rate of flow is controlled by the spill tube arrangement, whereby a constant liquid head is maintained within the container 342. Further, the cleaning wire 358 insures that the orifice 352 will not become clogged, and hence also guards against any reduction in the rate of flow into the float tank 4. It will be understood that the float 286 will actuate the valve 6 to assure a continuous supply of water to replenish the mixture of soap solution and water being continually pumped to the coil 2, and to provide raw water to be mixed with the soap solution being continually dispensed by the meter 8.

The floats 396 and 398 will visually indicate to the operator whether or not the liquid soap solution has the required concentration. Hence, the presence of an improperly mixed liquid soap solution will be readily apparent, and can be easily corrected by adding more detergent or water to the tank 2. Thus, unskilled labor can determine by observation if the soap concentration is correct.

Obviously, many modifications and variations of the present invention are possible in the light of the above teachings. It is, therefore, to be understood that within the scope of the appended claims, the principles of the invention may be practiced otherwise than as specifically described.

We claim:

1. Apparatus for mixing two liquids according to a preselected, proportionate ratio, comprising: a first tank for a first liquid; a second tank for a second liquid, said second tank including an outlet port; a liquid dispensing meter including a container having an orifice therein positioned to discharge into said second tank; conduit means interconnecting said first tank with said container; pump means connected in said conduit means, and arranged to pump said first liquid from said first tank into said container; and adjustable means within said container for establishing a working liquid head above said orifice.

2. Apparatus as recited in claim 1, including additionally: a valve positioned to discharge into said second tank for admitting said second liquid thereinto; and means within said second tank and connected to said valve for controlling said valve in response to the liquid level within said second tank.

3. Apparatus as recited in claim 1, including additionally: a withdrawal conduit connected between said outlet port and said pump means, said pump means being operable to simultaneously and proportionately pump both said first liquid from said first tank, and a liquid mixture from said second tank comprised of said first liquid and said second liquid.

4. Apparatus as recited in claim 1, wherein said adjustable means for establishing a working liquid head comprises: a generally vertically disposed spill tube slidably mounted within a bore extending through the wall of said container, the upper end of said spill tube opening into said container, and the lower end thereof being positioned to discharge into said first tank.

5. Apparatus as recited in claim 1, including additionally: graduations on the container and means within said container cooperable with said graduations to indicate whether said first liquid has the desired specific gravity.

6. Apparatus as recited in claim 5, wherein said means for indicating the specific gravity of said first liquid comprises at least one float, said float having a mass designed so that it will float at the surface of said first liquid in response to the existence of a preselected value for the specific gravity of said first liquid.

7. Apparatus for mixing two liquids according to a preselected, proportionate ratio, comprising: a first tank for a first liquid; a second tank for a second liquid, said second tank including an outlet port; valve means positioned to discharge into said second tank for admitting said second liquid thereinto, and operable in response to the level of said second liquid in said second tank; a liquid dispensing meter including a container having an orifice therein positioned to discharge into said second tank; pump means, including at least two simultaneously operated pump units; first conduit means connected with one of said pump units, and communicating said first tank with said container, said one pump unit being operable to transfer said first liquid from said first tank into said container at a rate of flow greater than the rate at which such liquid can flow out of said container through said orifice; second conduit means connected with the other of said pump units and with said outlet port on said second tank; and adjustable means within said container for establishing a working liquid head above said orifice.

8. Apparatus as recited in claim 7, wherein said pump means comprises: a frame; a manifold housing mounted on said frame, and having at least two pump chambers associated therewith; at least two pairs of spaced, one-way valves, one pair being mounted within each of said pump chambers; a first diaphragm carried by said frame and said manifold housing, one side of said first diaphragm being in communication with one of said chambers; a second diaphragm carried by said manifold housing, the opposite sides of said second diaphragm being in communication with said one chamber and with the other of said chambers, respectively; and means for reciprocating said first diaphragm to pump fluid through said one chamber, and to thereby reciprocate said second diaphragm to simultaneously and proportionately pump fluid through the other of said chambers.

9. Apparatus as recited in claim 7, wherein said last mentioned means comprises: a generally vertically disposed spill tube slidably mounted within a bore extending through the wall of said container, the upper end of said spill tube opening into said container, and the lower end thereof being positioned to drain into said first tank.

10. Apparatus as recited in claim 7, including additionally: at least one float within said container, said float having mass designed so that it will float at a given level within said first liquid corresponding to a preselected value for the specific gravity of said first liquid.

11. Apparatus as recited in claim 7, wherein said second tank includes a drain port in the bottom thereof positioned to discharge into said first tank, and including additionally: a handle positioned above said drain port; interengaged means on said handle and said second tank arranged to retain said handle in position and to constrain movement thereof to a vertical direction; and a stopper mounted on the lower end of said handle, and receivable within said drain port.

12. Apparatus for dispensing a heated mixture of liquids, comprising: a first tank for a first liquid, a second tank for a second liquid, said second tank including an outlet port; a liquid dispensing meter including a container having an orifice therein positioned to discharge into said second tank; coil means for heating a liquid, said coil means having an inlet and an outlet; pump means; first conduit means connected with said pump means, and communicating said outlet port of said second tank with the inlet of said coil means; second conduit means connected with said pump means, and communicating said first tank with said container; and adjustable means within said container for establishing a substantially constant working liquid head above said orifice.

13. Apparatus as recited in claim 12, wherein said coil means includes a liquid fuel burner, and wherein said pump means includes three simultaneously operated pump units, a first one of said pump units being connected to said first conduit means to pump liquid from said second tank to said coil means, and a second one of said pump units being connected to said second conduit means to pump liquid from said first tank to said container; and including additionally: a fuel storage tank; and a third conduit connected with a third one of said pump units for pumping fuel from said fuel tank to said burner.

14. Apparatus as recited in claim 12, including additionally: a bypass conduit connecting the outlet port of said coil means with said first tank; and valve means connected in said bypass conduit.

15. A liquid dispensing meter for delivering liquid at a preselected uniform rate of continuous flow, comprising: a container having a continuously open inlet for continuously admitting liquid into said container and having a continuously open metering orifice in the bottom wall thereof separate from and of smaller size than said inlet for continuously draining liquid from said container at a slower rate than that at which it is introduced into said container, said container further including a generally vertical bore extending through said bottom wall; and a spill tube slidably received within said vertical bore, said spill tube having a continuously open passage therethrough of larger size than said inlet and being vertically adjustable to effect the establishment and maintenance of a predetermined constant liquid working head in said container above said continuously open orifice.

16. A liquid dispensing meter as recited in claim 15, including additionally at least one float disposed within said container, said float having a mass designed so that it will assume a predetermined level within a liquid contained in said container, corresponding to a given value for the specific gravity of said liquid, whereby the specific gravity of said liquid is indicated by the level which said float assumes.

17. A liquid dispensing meter as recited in claim 15, wherein a plurality of different colored floats are disposed within said container, the masses of said floats being different and being chosen so that different floats will assume different levels within said liquid, corresponding to predetermined specific gravity values for said liquid, whereby the specific gravity of said liquid is indicated by the levels which said floats assume.

18. A liquid dispensing meter as recited in claim 15 wherein the inlet is a port in the lower portion of said container, and including additionally, a baffle mounted within said container in position to confront said inlet port, said baffle being spaced from said inlet port.

19. A liquid dispensing meter as recited in claim 15 including additionally a thin, elongated cleaning element disposed within and extending through said metering orifice, and movable in response to the flow of liquid therethrough to maintain said orifice clean.

20. A tank, including: a bottom wall; side wall means extending upwardly from said bottom wall, said bottom wall having a vertical drain passage therethrough disposed adjacent said side wall means; means on the inner surface of said side wall means adjacent said drain passage defining a vertical channel, said channel extending parallel to the axis of said drain passage and opening into said tank;

and a drain plug assembly for closing said drain passage, comprising: an elongated member having a vertical rib on the rear edge thereof, said rib being engaged within said vertical channel to mount said elongated member for sliding movement toward and away from said drain passage, and said elongated member including a lower portion disposed to extend over said drain passage when said rib is engaged within said channel; a drain plug attached to said lower portion of said elongated member, and receivable within the upper end of said vertical drain passage to close the same; and a finger hold projecting from the upper end of said elongated member for lifting said drain plug assembly to remove said drain plug from said vertical passage.

References Cited by the Examiner

UNITED STATES PATENTS

| | | | |
|---|---|---|---|
| 647,111 | 4/1900 | Paradis. | |
| 1,242,137 | 10/1917 | Bullard. | |
| 1,467,425 | 9/1923 | Delanoy | 222—432 |
| 1,657,264 | 1/1928 | Lauterbur | 222—424 X |
| 1,660,149 | 2/1928 | Beadle | 222—134 |
| 1,824,394 | 9/1931 | Crane | 222—561 |
| 1,838,563 | 12/1931 | Maxey | 137—92 |
| 1,927,447 | 9/1933 | Rybeck | 222—434 |
| 2,015,997 | 10/1935 | Fee | 222—434X |
| 2,165,321 | 7/1939 | Wertz | 239—137 X |
| 2,171,312 | 10/1939 | Meyers | 137—192 |
| 2,203,925 | 6/1940 | Poirer | 137—192 |
| 2,302,326 | 11/1942 | Kehoe et al. | 137—92 |
| 2,318,766 | 5/1943 | Ellis | 222—68 X |
| 2,349,665 | 5/1944 | Levit | 222—509 X |
| 2,507,738 | 5/1950 | Spatz | 222—148 X |
| 2,755,130 | 7/1956 | Arant | 239—137 |
| 2,765,105 | 10/1956 | Sullivan | 222—510 |
| 2,840,147 | 6/1958 | Almestad | 222—51 |
| 2,877,867 | 3/1959 | Cain et al. | |

RAPHAEL M. LUPO, *Primary Examiner.*

A. McKEON, *Assistant Examiner.*